(12) United States Patent
Palmer

(10) Patent No.: US 9,862,062 B1
(45) Date of Patent: Jan. 9, 2018

(54) APPARATUS FOR SECURING SHEET METAL PANELS FOR BUTT-WELDING WITH INTEGRAL COPPER BACKING PLATE

(71) Applicant: Edward Gerald Palmer, Indialantic, FL (US)

(72) Inventor: Edward Gerald Palmer, Indialantic, FL (US)

(73) Assignee: Edward G. Palmer, Indialantic, FL (US)

( * ) Notice: Subject to any disclaimer, the term of this patent is extended or adjusted under 35 U.S.C. 154(b) by 0 days.

(21) Appl. No.: 15/409,524

(22) Filed: Jan. 18, 2017

(51) Int. Cl.
  *B23K 37/04* (2006.01)
  *B23K 101/00* (2006.01)
  *B23K 101/18* (2006.01)

(52) U.S. Cl.
  CPC .... *B23K 37/0435* (2013.01); *B23K 2201/006* (2013.01); *B23K 2201/18* (2013.01)

(58) Field of Classification Search
  USPC ......................................................... 228/50
  See application file for complete search history.

(56) References Cited

U.S. PATENT DOCUMENTS

| | | | | |
|---|---|---|---|---|
| 3,063,393 A | * | 11/1962 | Brandenburg | B23K 37/0408 219/125.1 |
| 3,273,881 A | * | 9/1966 | Kiefer | B23K 5/22 228/57 |
| 5,158,225 A | * | 10/1992 | Ksioszk | B23K 37/04 219/160 |
| 5,584,427 A | * | 12/1996 | Suaso | B23K 9/32 219/74 |
| 2010/0243714 A1 | * | 9/2010 | Allehaux | B23K 20/1235 228/104 |

* cited by examiner

*Primary Examiner* — Devang R Patel

(57) ABSTRACT

A welding clamp uses opposing metal pieces to clamp two pieces of sheet metal together with a defined gap between panels for the purpose of welding, in this case, butt welding. The clamp has an integral copper backing plate to provide weld backing support and thermal dissipation to the metal for improved butt weld results. The integral copper backing plate adds stiffness to the adjoined panels while providing a solid non-weldable backing support to the panels being joined, reducing or eliminating weld blow-through.

6 Claims, 6 Drawing Sheets

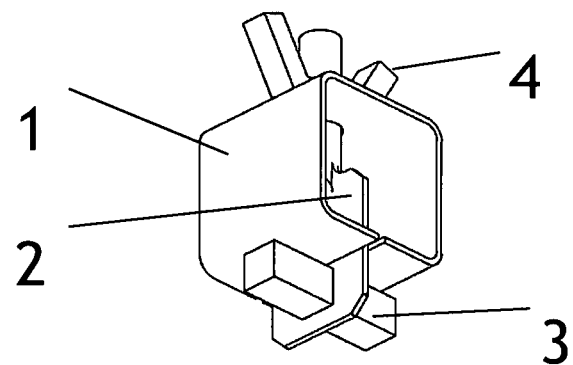
_Fig. 1 Prior Art_

APPARATUS FOR SECURING SHEET METAL PANELS FOR BUTT-WELDING WITH INTEGRAL COPPER BACKING PLATE

FIELD OF THE INVENTION

The present invention is in the technical field of welding. More particularly, the present invention is in the technical field of sheet metal butt welding. More particularly, the present invention is in the technical field of weldment backing and support of sheet metal.

BACKGROUND OF THE INVENTION

Butt welding of sheet metal panels, particularly in the automotive restoration and repair field, typically utilizes panel clamps to secure two panels together parallel to each other and with a defined gap, approximately the thickness of the sheet metal. Typically, as shown in the prior art of FIG. 1, the extruded clamp secures approximately 1" of the panel. However, the backside clamping pin 3 does not extend on either side of the extruded frame. The gap between the panels is open, with no backing provided. The prior art shown in FIG. 1 provides adequate spacing and some level of support of the two adjoining pieces of sheet metal but does not provide an integral means of backing the weldment to prevent blowout of the weld and maintain tighter panel coplanarity along the length of the panel. Additional copper backing apparatus are available that are either hand held or magnetically held in place behind the panels to assist the welding operation. Often, it is impossible to reach behind the panel to hold the backing piece in place, particularly for a single operator. Magnetic backing plates do not provide additional structural support or adequate thermal dissipation and may negatively affect the quality of the weld itself.

Other examples of prior art also do not satisfy the viability of the present invention. Brandenburg, et al, in U.S. Pat. No. 3,063,393, present a welding fixture intended for larger production welding and in particular, an apparatus designed for hot short materials (material subject to cracking upon cooling). The apparatus is also too cumbersome and complex for the intended purpose of this invention.

In U.S. Pat. No. 3,272,881A, Kiefer is presenting an invention to aid the weld operator in holding a patch panel in place with the use of a "third hand" mechanism. It does not address butt welding nor does it provide clamping or thermal dissipation of the weld heat.

The invention noted in U.S. Pat. No. 5,158,225 is an example of a backing plate in its simplest form. It is simply a piece of copper on a handle that is held in place by the operator or an assistant. This tool provides no clamping support and is only useful for small holes, short welds and where access by the operator to an assistance to reach the backing location is possible.

U.S. Pat. No. 5,584,427 is an invention the is designed to aid in the formation and concentration of shield gas on the back-side of a welded joint in pipes. It does not provide clamping or gap control.

US2010/034374 A1 (now U.S. Pat. No. 8,393,529 B2) is used in a process known as friction welding. Although copper is used as a backer, the banker is not configured in the same manner, not could this apparatus be utilized for conventional butt welding in the intended manner and applications.

None of the prior art apparatus' are capable of being implemented in the manner of the present invention that would provide the operator with simple hands free welding operation with secure aligned panels and the benefit of a copper backer to secure the panels in a proper position for optimum welding. Few of the prior art inventions provides the copper backer as part of the clamping mechanism. Those that do are too large and cumbersome for this application.

SUMMARY OF THE INVENTION

The present invention provides a solution to minimize or totally eliminate blowout of welds on thin sheet metal panels while maintaining a proper gap between sheets and reducing warpage in panels due to overheating. By including a copper backing feature that is integral to the clamp, the welder is provided a secure platform to perform butt welding with minimal risk of blow out of the weld. The copper backing plate portion of the clamp also provides a heat sink to help dissipate heat from the panel, thus minimizing warping. The clamps are designed to provide both local clamping and backing support when positioned along the length of the intended panels to be welded.

In another aspect of the invention, the backing plate is extended and clamping features are provided at both ends. This provides a further increase in panel support over a longer (~10-12") span. Once again, this aspect of the invention provides full backing support and reduces warping by acting as a heat sink to the.

In still another aspect of the invention, the longer backing plate may be formed with a defined radius of curvature or unique shape. This allows the alignment and support of curved or odd shaped panels, providing a more accurate weldment.

BRIEF DESCRIPTION OF THE DRAWINGS

Other objects, features and advantages of the present invention will become apparent from the detailed description of the invention which follows, when considered in light of the accompanying drawings in which:

FIG. 1 is a schematic isometric view of the prior art welding clamp

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiment set forth herein. Rather, these embodiments are provided so that this disclosure will be thorough and complete, and will fully convey the scope of the invention to those skilled in the art. Like numbers refer to like elements throughout.

The present invention is advantageous because it provides the welder with an integral copper backing plate with which to support the formation of the weld joint as well as to provide a heat sink with which to dissipate heat from the weld. Many prior art devices only provide a welding clamp with a localized backing clamp (flat or round) that does not provide weld support along any significant length of the panel nor additional heat sinking ability. With the addition of the copper backing plate, the sheet metal panels are well supported over a longer span, the weld material has a place to form without burning through, and the additional copper mass provides a heat sink in which to dissipate the heat from the localized weld spot.

FIG. 1 illustrates a prior art butt weld clamping apparatus that contains an extruded or formed main clamp body 1, a threaded clamp thickness setting blade 2, a bottom clamp pin 3 and a tightening wing nut 4. The bottom clamp pin 3 provides minimal clamping length coverage and no ability to provide backing support for the weld to prevent weld blow-through or heat dissipation. The extruded/formed main clamp is approximately 1" on all sides. The clamp thickness gap is approximately 0.04".

Figure 2:
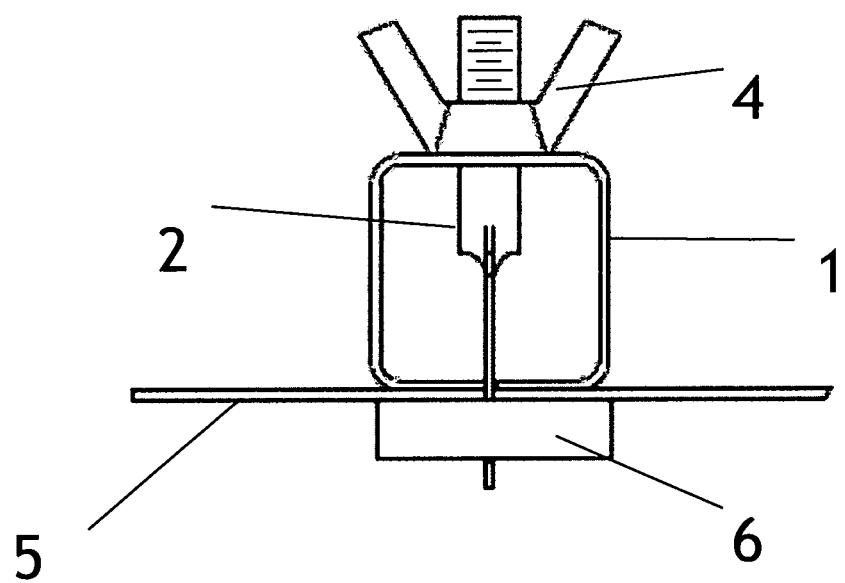
FIG. 2 is a side view of a welding clamp of the present invention and showing the sheet metal panels clamped between the two halves of the clamp.
Figure 3:
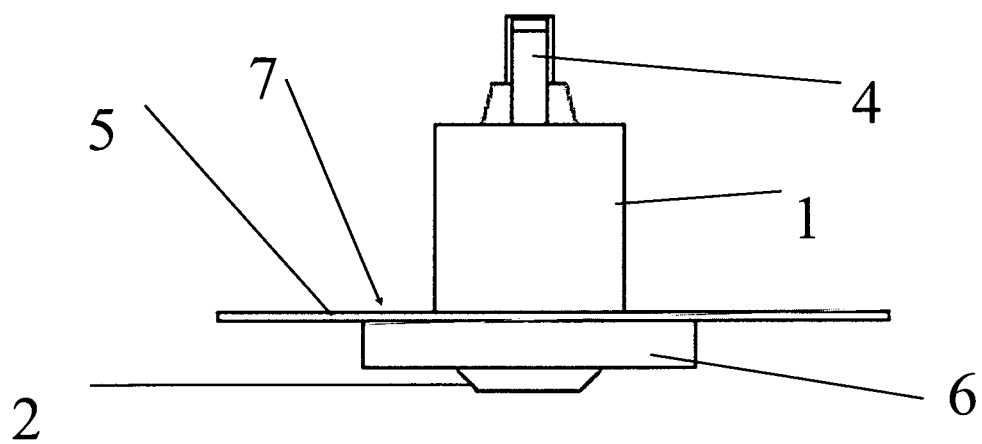
FIG. 3 is a schematic front view of the welding clamp of the present invention shown in FIG. 2.
Figure 4:
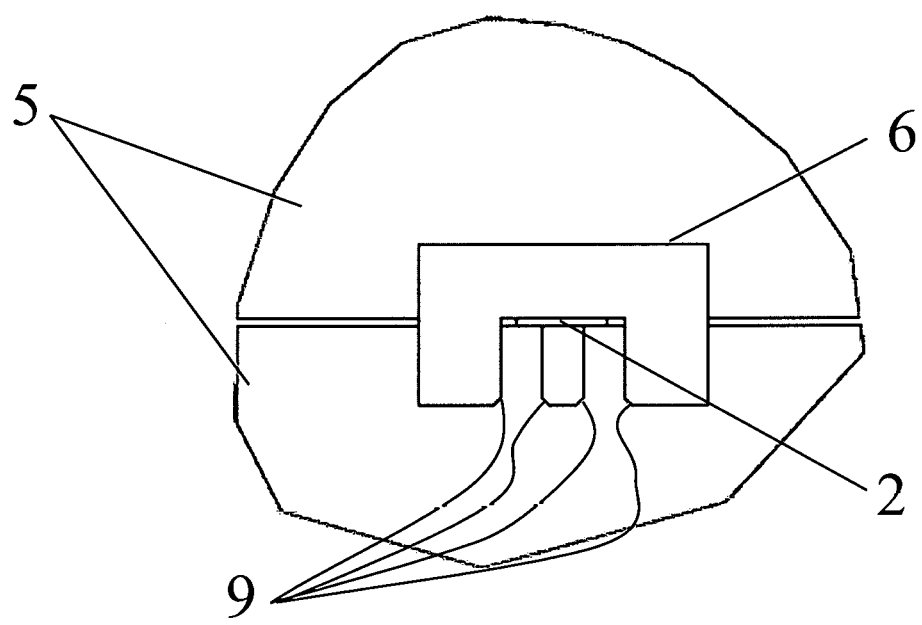
FIG. 4 is a schematic bottom view of the welding clamp of the present invention and showing the particular backing support clamp that defines this invention.
Figure 5:
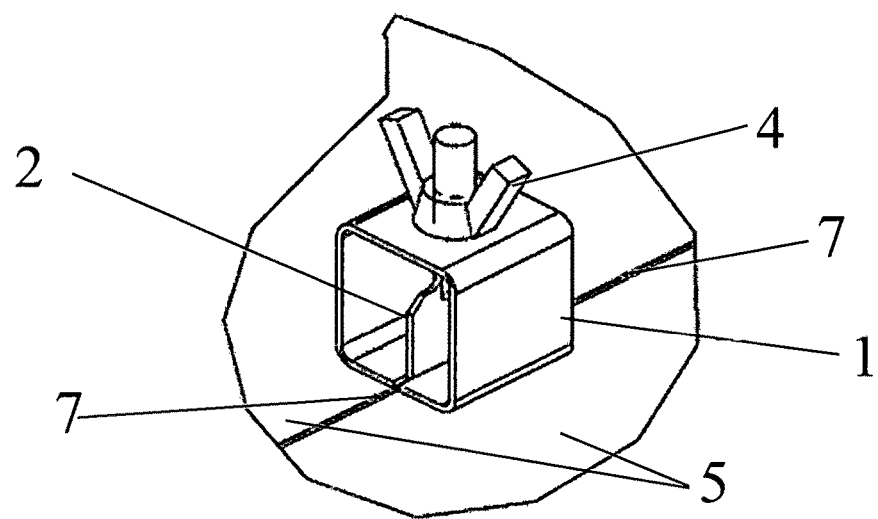
FIG. 5 is a schematic perspective view of the welding clamp of the present invention and showing the panels secured between the clamp and the provided gap.
Figure 6:
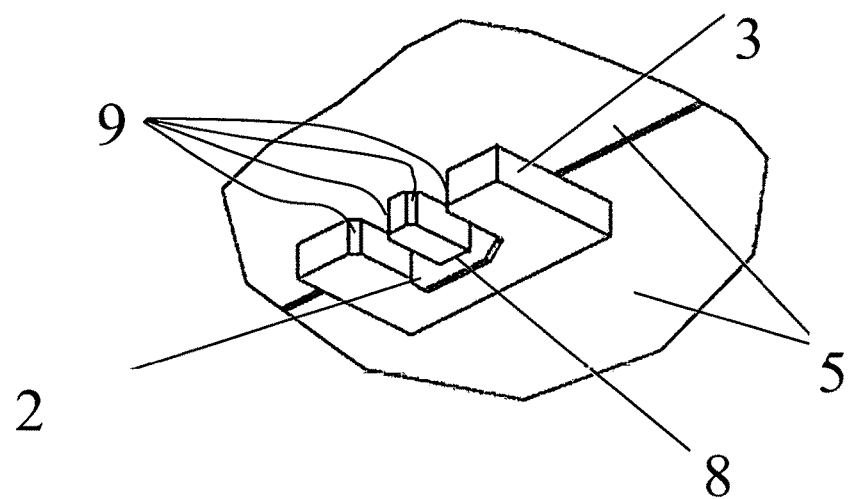
FIG. 6 is another schematic perspective view of the welding clamp of the present invention and showing the particular backing support clamp that defines this invention.

In accordance with the present invention, the bottom clamp pin 3 shown in FIG. 1 is eliminated. As shown in FIGS. 2 and 3, the present invention has a backing plate 6 comprised of a copper alloy that is longer than the length of the main clamp body 1. This additional length provides the added stiffness and backing for the weld 7. This added length is approximately 0.5" to 2", depending on need. FIG. 4 illustrates the backing plate 6 installed behind two sheet metal panels 5. The backing plate 6 is shaped like an E with the center section being the same size as the backing pin 3 of the prior art. This pin 3 is approximately 0.25" square by 1" long. This allows the use of certain existing prior art welding clamps as shown in FIG. 1 with the replacement of the backing pin 3 with the copper alloy backing plate 6 from the present invention. FIG. 6 more clearly shows the embodiment of the copper alloy backing plate 6 and how it engages through the square opening 8 in the threaded clamp blade 2. It is also apparent in FIG. 3 how the backing plate 6 is longer than the clamp blade 2 and the clamp frame 1, thus providing additional clamping area under the panels 5. FIGS. 3 and 5 illustrates where the welding 7 occurs on either side of the top clamp 1.

Figure 7:
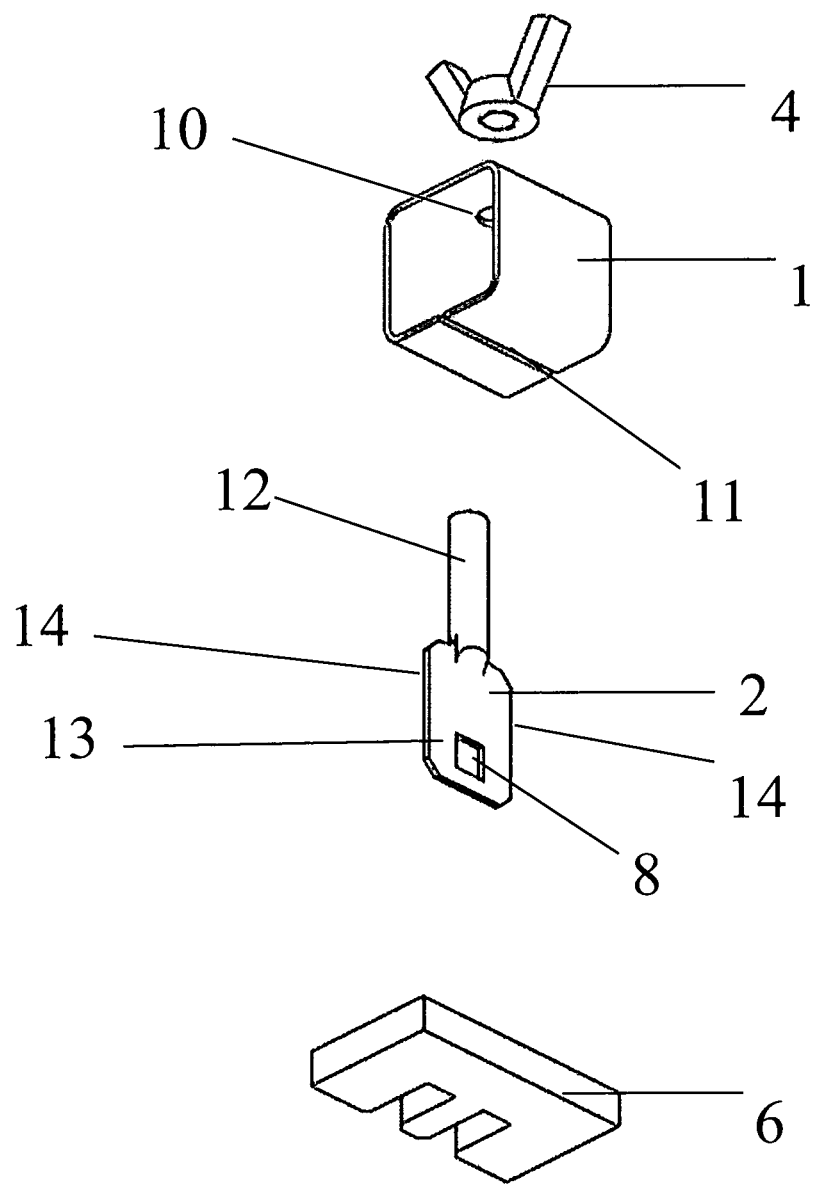
FIG. 7 is a schematic exploded view of a welding clamp of the present invention and showing the individual piece parts of the clamp.

FIG. 7 is a schematic exploded view of the components that make up the embodiment of the invention. The shape of the copper alloy backing plate 6 is clear. FIGS. 4 and 6 show the addition of chamfers 9 on the corners of the portions of the backing plate 6 that immediately adjoin the square opening 8 or the outer edges 14 of the spacer plate 2. These chamfers assist in assembling the tool during practice by guiding the backing plate 6 through the square opening 8 in the spacer plate 2.

In accordance with the present invention, as shown in FIG. 7 the apparatus comprises a clamp mechanism 1 and 2 and a copper backing plate 6. Item 1 is four sided metal extrusion containing a hole 10 at one side and a full slot 11 on the opposite side. The flat spacer plate 2 contains a threaded portion 12 on top to provide clamping force that extends through the hole 10 in the center of the top metal extrusion 1 and a flat portion 13 that extends through the slot 11 in the opposite side of the extrusion and also extends though the sheet metal panels 5. The copper backing plate 6 is secured on the opposite side of the sheet metal panels 5 by passing through the square opening 8 in the flat plate 2.

Figure 8:
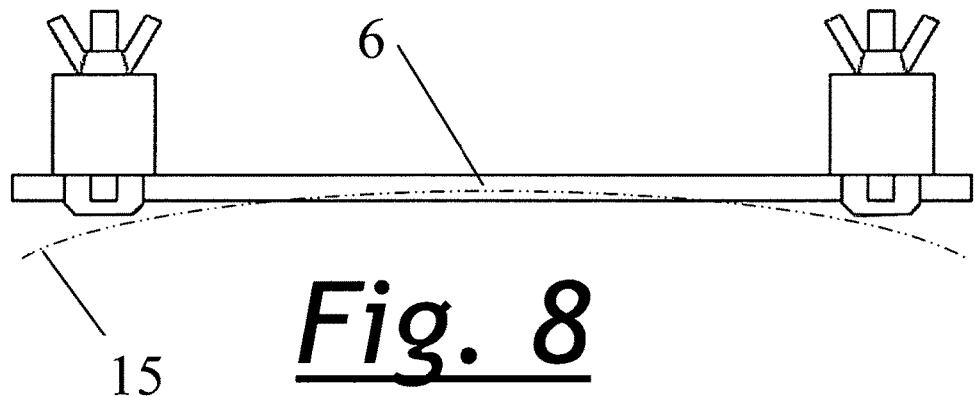
FIG. 8 is a schematic side view of an embodiment of the welding clamp of the present invention that spans a longer section of panel.
Figure 9:
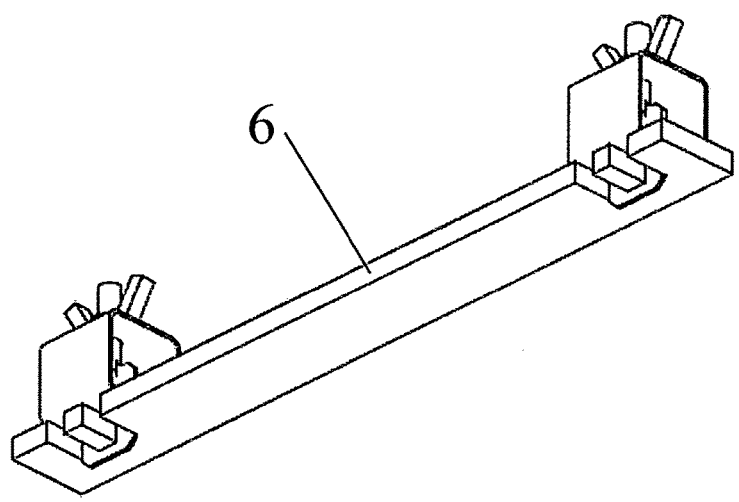
FIG. 9 is a schematic perspective view of the welding clamp of the present invention that spans a longer section of panel.

In accordance with the present invention, and as shown in FIGS. 8 and 9, the copper alloy backing plate 6 may be increased in length. This added length provides backing support over a longer length of panel, minimizing the number of total clamps or the frequency of relocating clamps during the welding process. Additionally, these longer clamps may be manufactured (or modified by the user) to have a defined arc 15 formed for support of curved panels.

Many modifications and other embodiments of the invention will come to mind of on skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A welding clamp for welding sheet metal panels, comprising:
   A. a four sided metal extrusion body containing a hole at one side and a full slot on an opposite side;
   B. a setting blade including a flat spacer plate that extends through the full slot and a threaded portion that extends through the hole; and
   C. a copper backing plate that is secured below the sheet metal panels, wherein a portion of the copper backing plate passes through an opening in the flat spacer plate and the copper backing plate is E-shaped to provide butt weld backing and clamping.

2. The welding clamp according to claim 1, wherein the copper backing plate has a length longer than a length of the sheet metal panels which contacts the copper backing plate.

3. The welding clamp according to claim 1, wherein the copper backing plate is curved.

4. The welding clamp according to claim 1, wherein the copper backing plate is made of a copper alloy that is capable of dissipating heat from the weld more efficiently than through the welded sheet metal panels themselves.

5. The welding clamp according to claim 1, wherein the copper backing plate includes chamfered corners on portions of the copper backing plate.

6. The welding clamp according to claim 1, further comprising a plurality of four-sided metal extrusion bodies and setting blades with a common copper backing plate.

* * * * *